UNITED STATES PATENT OFFICE 2,027,477

PROCESS FOR THE MANUFACTURE OF ALKALI DICHROMATE

Ernst Hackhofer and Annemarie Beuther, Krefeld-Uerdingen, Germany, assignors to I. G. Farbenindustrie Aktiengesellschaft, Frankfort-on-the-Main, Germany No Drawing. Application July 3, 1933, Serial No. 678,992. In Germany September 17, 1932

17 Claims. (Cl. 23—56)

The present invention relates to the manufacture of alkali dichromate from alkali monochromate.

The conversion of sodium monochromate to sodium dichromate by means of carbonic acid or gases containing carbonic acid is known. It is also known that the reaction is dependent on the carbonic acid pressure and on the concentration of the chromate solution and indeed that the yield of dichromate increases with increased pressure and increased chromate concentration.

The various proposals made on the basis of this existing knowledge for producing sodium dichromate industrially by means of carbonic acid did not lead to any practical result. The reason for this is to be looked for in the fact that by maintaining the working conditions indicated the rate of the decomposition is too low and in given cases the degree of decomposition attainable is too small while conversely the sodium bicarbonate produced as a by-product precipitates in a slimy condition and can only be separated from the dichromate solution with great difficulty.

As the result of further investigation and research and in accordance with the present invention the above indicated disadvantages can be obviated by effecting the conversion under superatmospheric carbonic acid pressure at a sufficiently high temperature, which at the beginning of the reaction should amount to at least 50° C., but which may be considerably higher.

The process can be carried out with particular advantage in the following manner. An alkali monochromate solution, for example a sodium monochromate solution, is first treated with carbonic acid at a temperature exceeding 50° C. At such a temperature, even at a partial pressure of carbonic acid of, for example 2-3 atmospheres, the carbonic acid is rapidly absorbed on account of the high reaction velocity. The temperature is then allowed to fall slowly while simultaneously the carbonic acid pressure of the introduced gas is increased. When following this method of working conversion can commence at, for example 60–80° C. with a partial pressure of carbonic acid of 2-3 atmospheres and allowing the temperature to fall to a temperature of about 20 to about 30° C. in the course of about one hour while the partial pressure of carbonic acid is increased to 6-8 atmospheres. The well crystallized sodium bicarbonate is then separated by filtration.

The carbonic acid can be employed as such or in admixture with other gases, such as technical gas mixtures, for example gases from lime kilns. When reducing gases, such as for example hydrogen sulphide or sulphur dioxide are present in these mixtures it is to be recommended to separate the same previously in the known manner.

When the process is carried out with potassium chromate instead of sodium chromate the potassium dichromate separates in a solid form in accordance with the rate of the solubility of the same while the potassium bicarbonate remains in solution and the potassium dichromate is then separated by filtration.

It is particularly advantageous to carry out the process in two stages by first converting a concentrated monochromate solution with carbonic acid under the conditions outlined above, concentrating the filtrate containing a small quantity of monochromate and much dichromate and once again treating with carbonic acid under the same conditions of temperature and pressure. The process can likewise be carried out on the counter-current principle by treating a fresh, hot monochromate solution with the gas mixture already nearly exhausted of carbonic acid, while the chromate liquor with the highest degree of conversion is treated at approximately 20-30° C. with the gases richest in carbonic acid.

According to our present knowledge we find that for carrying out the process an initial temperature interval of about 60° to about 80° C. and a partial pressure interval of carbonic acid of about 6 to about 8 atmospheres are particularly suitable. For economic reasons the temperature limit of about 100° C. will not in general be exceeded, though temperatures above 100° C. are also applicable. The upper limit for the pressure is limited only by the resistivity of the construction material. With regard to the lower pressure limit it is to be noted that the process can still be carried out at a partial pressure of carbonic acid of about 2 atmospheres.

The following example will further illustrate but not limit the invention:—

A sodium monochromate solution containing 475 grams of $CrO_3$ per litre is treated at about 60 to about 80° C. in a pressure-tight vessel fitted with stirring apparatus with carbonic acid under a partial pressure of about 6 to about 8 atmospheres. During the reaction the solution is cooled to a temperature of about 20 to about 30° C. in the course of 1-2 hours while the partial pressure of carbonic acid remains constant. The degree of conversion of the monochromate to dichromate, which is attainable amounts to 90%.

After releasing the pressure the well crystallized sodium bicarbonate is removed by filtration. The filtrate is evaporated until a concentration of about 800–820 grams of $CrO_3$ per litre is attained. The solution thus obtained is treated again with stirring at about 60 to about 80° C. in a pressure-tight vessel with carbonic acid under a partial pressure of about 6 to about 8 atmospheres. During the reaction the solution is cooled to a temperature of about 20 to about 30° C. in the course of 1–2 hours while the partial pressure of carbonic acid remains constant. The well crystallized sodium bicarbonate is removed by filtration after releasing the pressure. Even at this high concentration of the solution the sodium bicarbonate obtained separates in a form which filters well.

We claim:

1. Process for the manufacture of alkali dichromate which comprises reacting with carbonic acid under superatmospheric pressure on alkali monochromate solution at a temperature of at least 50° C., cooling down the solution during the reaction and separating the alkali bicarbonate from the alkali dichromate.

2. Process for the manufacture of alkali dichromate which comprises reacting with carbonic acid on alkali monochromate solution, the carbonic acid pressure being at least about 2–3 atmospheres, at an initial temperature of at least 50° C., cooling down the solution during the reaction and separating the alkali bicarbonate from the alkali dichromate.

3. Process for the manufacture of alkali dichromate which comprises reacting with carbonic acid on alkali monochromate solution, the carbonic acid pressure being at least about 2–3 atmospheres, at an initial temperature of at least 60° C., cooling down the solution during the reaction and separating the alkali bicarbonate from the alkali dichromate.

4. Process for the manufacture of alkali dichromate which comprises reacting with carbonic acid on alkali monochromate solution, the carbonic acid pressure being at least about 2–3 atmospheres, at an initial temperature of at least 50° C., cooling the solution during the reaction to a temperature of about 20 to about 30° C. and separating the alkali bicarbonate from the alkali dichromate.

5. Process for the manufacture of alkali dichromate which comprises reacting with carbonic acid on alkali monochromate solution, the carbonic acid pressure being at least about 2–3 atmospheres, at an initial temperature of at least 60° C., cooling down the solution during the reaction to a temperature of about 20 to about 30° C. and separating the alkali bicarbonate from the alkali dichromate.

6. Process for the manufacture of alkali dichromate which comprises reacting with carbonic acid on alkali monochromate solution, the carbonic acid pressure being at least about 2–3 atmospheres, at an initial temperature of about 50 to about 100° C., cooling down the solution during the reaction to a temperature of about 20 to about 30° C. and separating the alkali bicarbonate from the alkali dichromate.

7. Process for the manufacture of alkali dichromate which comprises reacting with carbonic acid on alkali monochromate solution, the carbonic acid pressure being at least about 2–3 atmospheres, at an initial temperature of about 60 to about 80° C., cooling down the solution during the reaction to a temperature of about 20 to about 30° C. and separating the alkali bicarbonate from the alkali dichromate.

8. Process for the manufacture of alkali dichromate which comprises reacting with carbonic acid on alkali monochromate solution, at a carbonic acid pressure of 6–8 atmospheres, at an initial temperature of about 60 to about 80° C., cooling down the solution during the reaction to a temperature of about 20 to about 30° C. and separating the alkali bicarbonate from the alkali dichromate.

9. Process for the manufacture of sodium dichromate which comprises reacting with carbonic acid under superatmospheric pressure on sodium monochromate solution at a temperature of at least 50° C., cooling down the solution during the reaction and separating the sodium bicarbonate from the solution.

10. Process for the manufacture of sodium dichromate which comprises reacting with carbonic acid on sodium monochromate solution, the carbonic acid pressure being at least about 2–3 atmospheres, at an initial temperature of at least 50° C., cooling down the solution during the reaction and separating the sodium bicarbonate from the solution.

11. Process for the manufacture of sodium dichromate which comprises reacting with carbonic acid on sodium monochromate solution, the carbonic acid pressure being at least about 2–3 atmospheres, at an initial temperature of at least 60° C., cooling down the solution during the reaction and separating the sodium bicarbonate from the solution.

12. Process for the manufacture of sodium dichromate which comprises reacting with carbonic acid on sodium monochromate solution, the carbonic acid pressure being at least about 2–3 atmospheres, at an initial temperature of at least 50° C., cooling down the solution during the reaction to a temperature of about 20 to about 30° C. and separating the sodium bicarbonate from the solution.

13. Process for the manufacture of sodium dichromate which comprises reacting with carbonic acid on sodium monochromate solution, the carbonic acid pressure being at least about 2–3 atmospheres, at an initial temperature of at least 50° C., cooling down the solution during the reaction to a temperature of about 20 to about 30° C., separating the sodium bicarbonate from the solution, concentrating the filtrate, again treating the solution thus obtained with carbonic acid under the conditions mentioned before and separating the sodium bicarbonate from the solution obtained in this manner.

14. Process for the manufacture of sodium dichromate which comprises reacting with carbonic acid on sodium monochromate solution, the carbonic acid pressure being at least 2–3 atmospheres, at an initial temperature of about 50 to about 100° C., cooling down the solution during the reaction to a temperature of about 20 to about 30° C. and separating the sodium bicarbonate from the solution.

15. Process for the manufacture of sodium dichromate which comprises reacting with carbonic acid on sodium monochromate solution, the carbonic acid pressure being at least about 2–3 atmospheres, at an initial temperature of about 60 to about 80° C., cooling down the solution during the reaction to a temperature of about 20 to about 30° C. and separating the sodium bicarbonate from the solution.

16. Process for the manufacture of sodium dichromate which comprises reacting with carbonic acid on sodium monochromate solution at a carbonic acid pressure of about 6 to about 8 atmospheres, at an initial temperature of about 60 to about 80° C., cooling down the solution during the reaction to a temperature of about 20 to about 30° C. in the course of 1-2 hours, separating the alkali bicarbonate from the solution, evaporating the filtrate to a content of about 800 grams $CrO_3$ per litre, again treating the solution thus obtained with carbonic acid under the conditions mentioned before and separating the sodium bicarbonate from the solution obtained in this manner.

17. Process for the manufacture of sodium dichromate which comprises reacting with carbonic acid on sodium monochromate solution the partial pressure of carbonic acid being 2-3 atmospheres at an initial temperature of about 60-80°, cooling down the solution during the reaction to a temperature of about 20 to about 30° in the course of about one hour, while the partial pressure of carbonic acid is increased to 6-8 atmospheres and separating the sodium bicarbonate from the solution.

ERNST HACKHOFER.
ANNEMARIE BEUTHER.